United States Patent
Tavildar et al.

(10) Patent No.: US 10,602,508 B2
(45) Date of Patent: Mar. 24, 2020

(54) LTE-DIRECT COMMUNICATION FOR VEHICLE-TO-VEHICLE

(71) Applicant: QUALCOMM Incorporated, San Diego, CA (US)

(72) Inventors: Saurabha Rangrao Tavildar, Jersey City, NJ (US); Navid Abedini, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 14/822,555

(22) Filed: Aug. 10, 2015

(65) Prior Publication Data

US 2017/0048837 A1 Feb. 16, 2017

(51) Int. Cl.
*H04W 72/04* (2009.01)
*H04W 4/70* (2018.01)
*H04L 5/00* (2006.01)

(52) U.S. Cl.
CPC ......... *H04W 72/044* (2013.01); *H04L 5/0044* (2013.01); *H04W 4/70* (2018.02)

(58) Field of Classification Search
CPC ........... H04W 72/044; H04W 72/0446; H04W 72/0453; H04W 72/04; H04W 4/005; H04W 88/02; H04W 28/18; H04W 4/70; H04W 72/0406; H04W 72/0413; H04W 72/1268; H04W 72/12; H04W 72/00; H04W 76/27; H04W 52/343; H04W 24/02; H04L 5/0044; H04L 63/10; H04L 5/001; H04L 5/0012; H04L 5/0023; H04L 5/0048; H04L 1/1861
See application file for complete search history.

(56) References Cited

U.S. PATENT DOCUMENTS

| | | | | |
|---|---|---|---|---|
| 8,184,672 B2* | 5/2012 | Arnott | .................. | H04B 1/7143 |
| | | | | 375/132 |
| 2009/0279493 A1* | 11/2009 | Gaal | ..................... | H04L 1/1861 |
| | | | | 370/329 |
| 2012/0257559 A1* | 10/2012 | Kim | ........................ | H04L 5/001 |
| | | | | 370/311 |
| 2012/0307922 A1 | 12/2012 | Simonsson et al. | | |
| 2014/0178430 A1* | 6/2014 | Nagata | | |
| 2015/0208406 A1 | 7/2015 | Seo et al. | | |

(Continued)

FOREIGN PATENT DOCUMENTS

| | | |
|---|---|---|
| EP | 2216953 A1 | 8/2010 |
| WO | 2015043778 A1 | 4/2015 |

OTHER PUBLICATIONS

English translation of WO 2014178430, Google Patents, Satoshi, Nagata, Jun. 11, 2014. (Year: 2014).*

(Continued)

*Primary Examiner* — Ricardo H Castaneyra
(74) *Attorney, Agent, or Firm* — Arent Fox, LLP

(57) ABSTRACT

A method, an apparatus, and a computer program product for wireless communication are provided. The apparatus determines K subsets of a resource pool. Each subset includes K grid elements. Additionally, each grid element includes at least K sub-elements. The apparatus selects one subset of the K subsets of the resource pool. Additionally, the apparatus transmits a message using K sub-elements of the selected subset.

25 Claims, 11 Drawing Sheets

(56) References Cited

U.S. PATENT DOCUMENTS

| | | | |
|---|---|---|---|
| 2016/0044729 A1* | 2/2016 | Tu .......................... | H04W 74/04 370/329 |
| 2016/0057693 A1* | 2/2016 | Nagata .................. | H04W 8/005 370/254 |
| 2016/0198504 A1* | 7/2016 | Seo ..................... | H04W 76/023 370/329 |

OTHER PUBLICATIONS

International Search Report and Written Opinion—PCT/US2016/041731—ISA/EPO—dated Oct. 4, 2016.

* cited by examiner

LTE-DIRECT COMMUNICATION FOR VEHICLE-TO-VEHICLE

BACKGROUND

Field

The present disclosure relates generally to communication systems, and more particularly, to the allocation of resources.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines K subsets of a resource pool. Each subset includes K grid elements. Additionally, each grid element includes at least K sub-elements. The apparatus selects one subset of the K subsets of the resource pool. Additionally, the apparatus transmits a message using K sub-elements of the selected subset.

DETAILED DESCRIPTION

Figure 1:
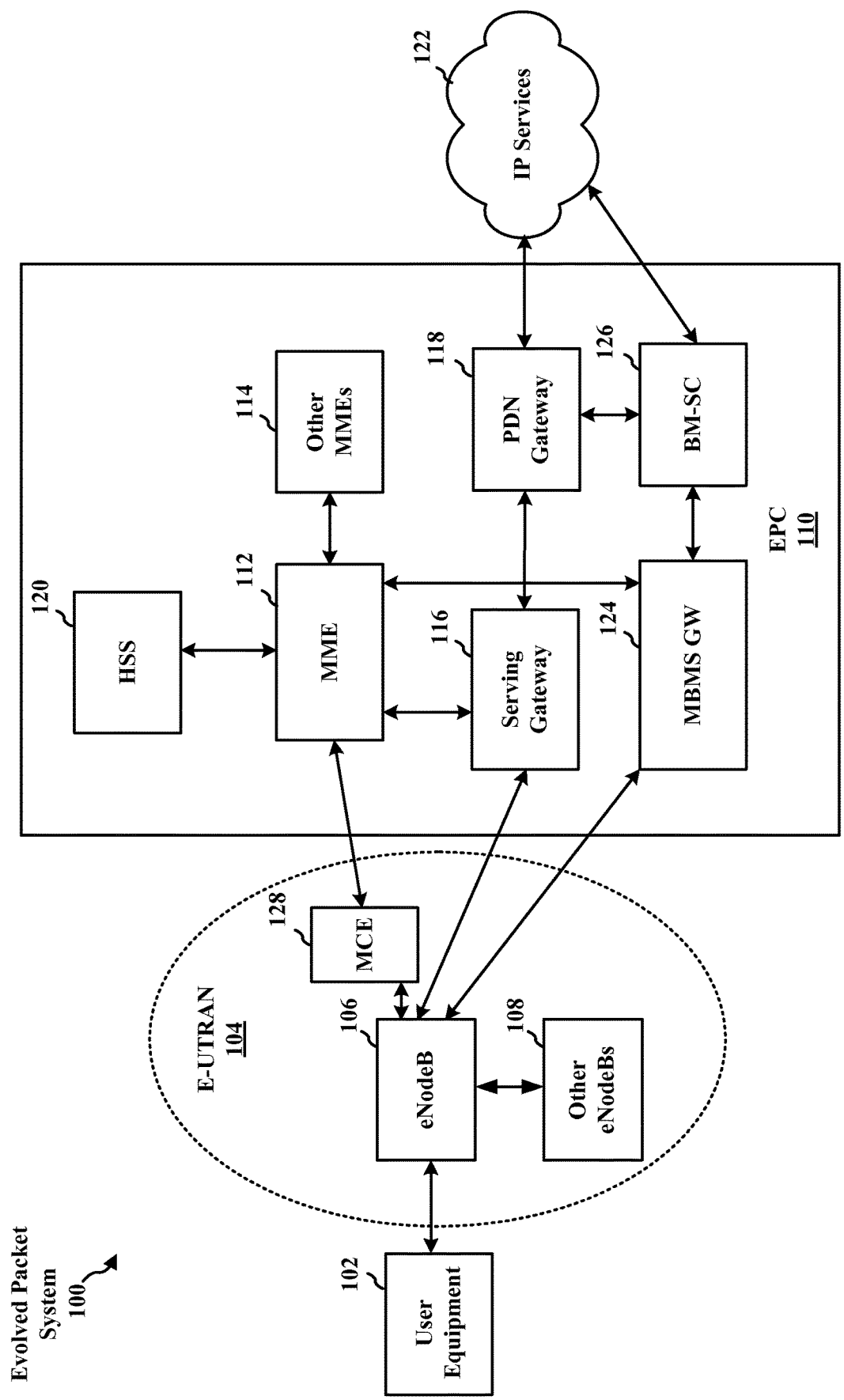
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

Some of the example systems and methods relate to a wireless communication device that determines K subsets of a resource pool, such as a discovery resource pool or other resources. Each subset may include K grid elements, each grid element including at least K sub-elements. The wireless communication device may select one subset of the K subsets of the resource pool. Additionally, the wireless communication device may transmit a message, such as a discovery message or other types of messages, using K sub-elements of the selected subset.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In some examples, UE 102 determines K subsets of a resource pool. Each subset may include K grid elements, each grid element including at least K sub-elements. The UE 102 may select one subset of the K subsets of the resource pool. Additionally, the UE 102 may transmit a message using K sub-elements of the selected subset.

Figure 2:
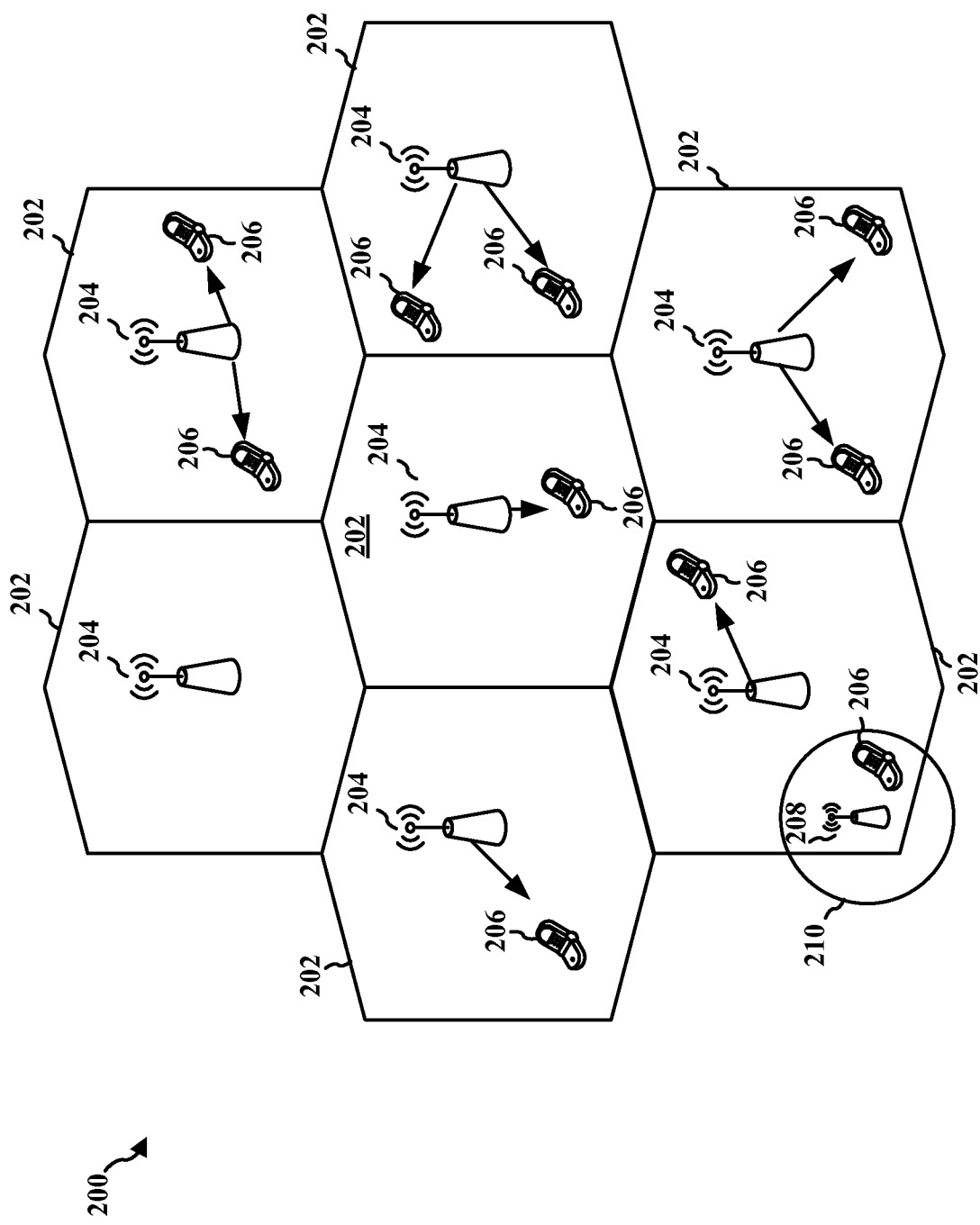
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femtocell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques.

By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

In some examples, UE 206 determines K subsets of a resource pool. Each subset may include K grid elements, each grid element including at least K sub-elements. The UE 206 may select one subset of the K subsets of the resource pool. Additionally, the UE 206 may transmit a message using K sub-elements of the selected subset.

Figure 3:
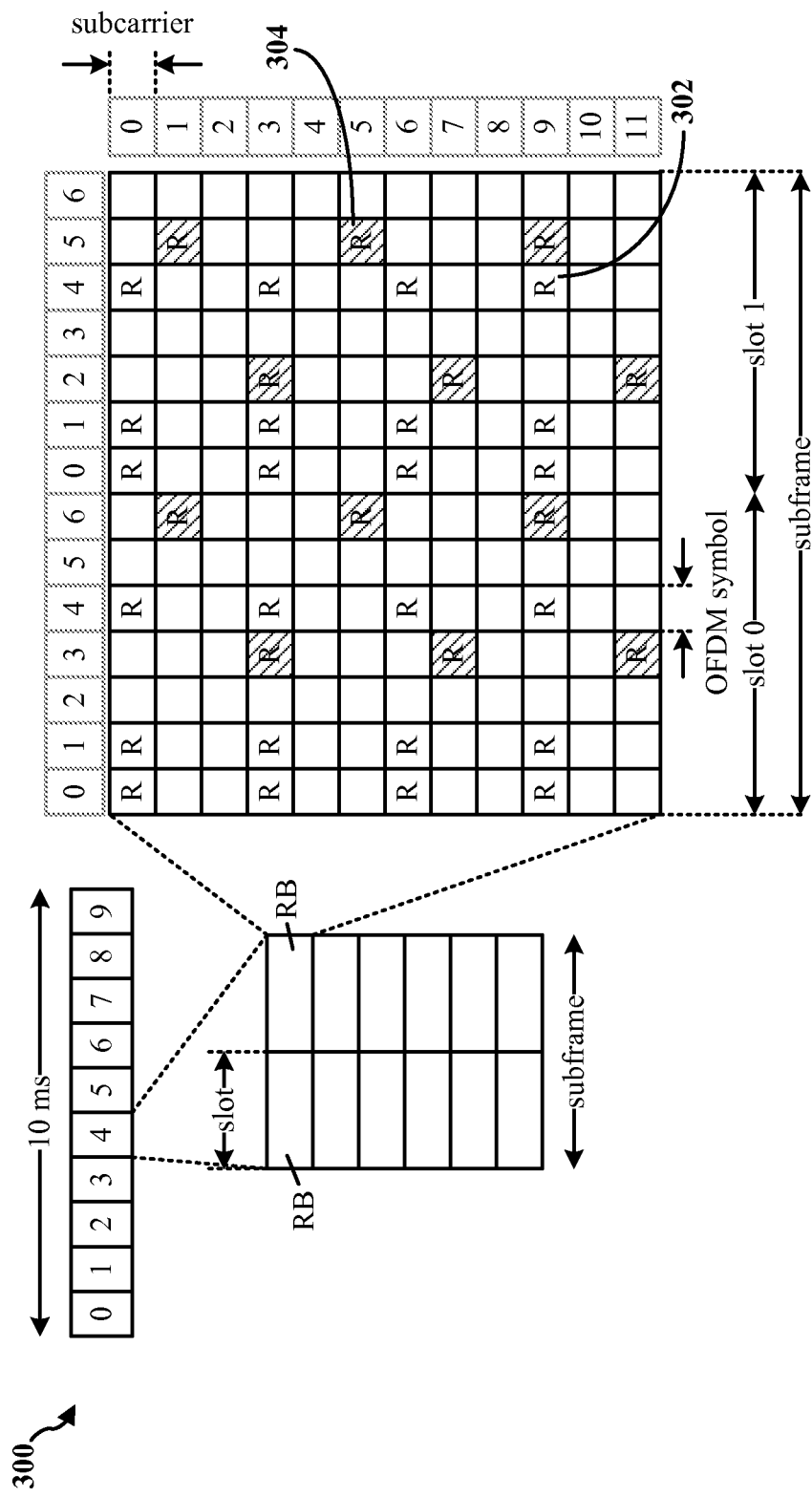
FIG. 3 is a diagram illustrating an example of a DL frame structure in LTE.

FIG. 3 is a diagram 300 illustrating an example of a DL frame structure in LTE. A frame (10 ms) may be divided into 10 equally-sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
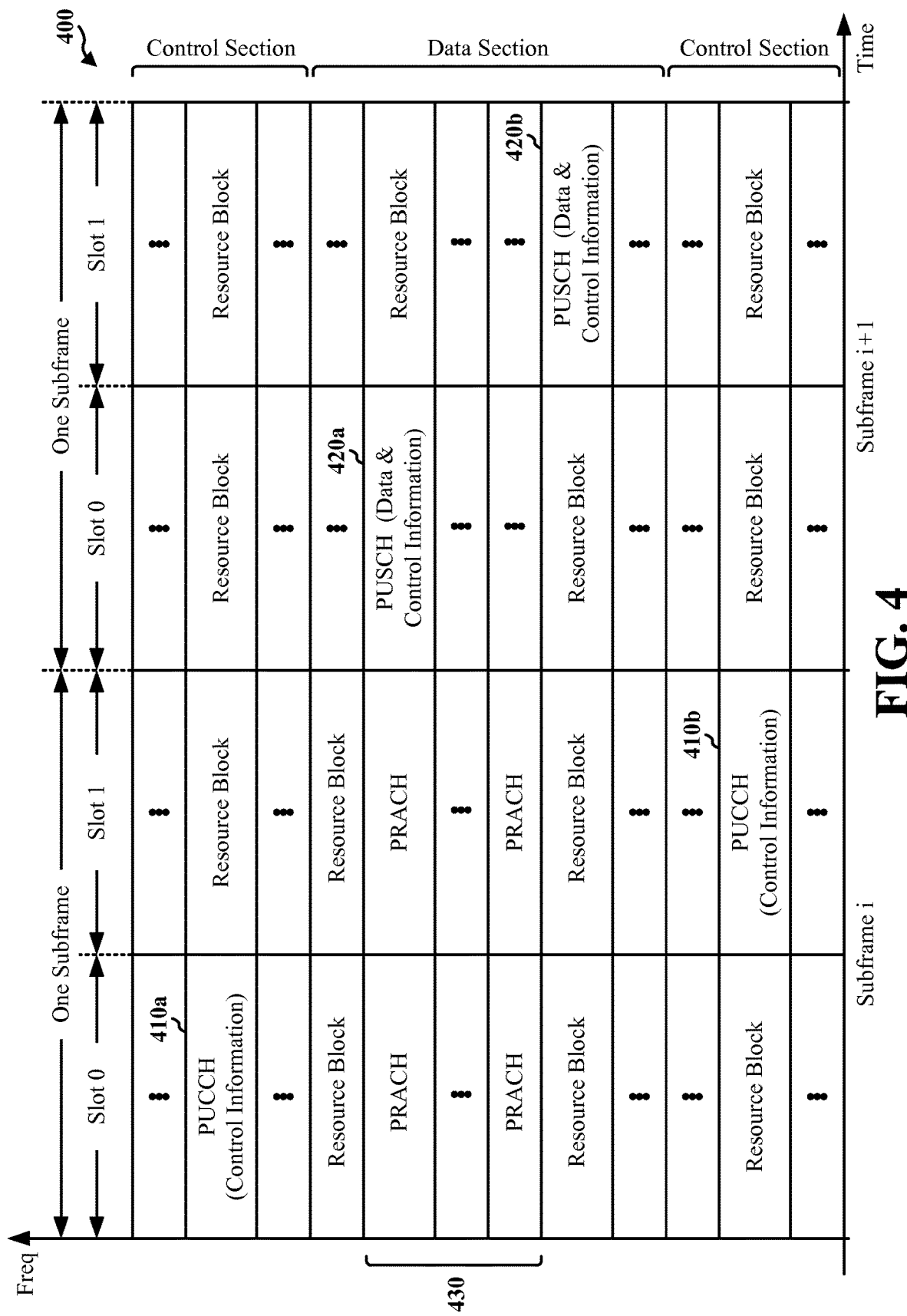
FIG. 4 is a diagram illustrating an example of a UL frame structure in LTE.

FIG. 4 is a diagram 400 illustrating an example of a UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
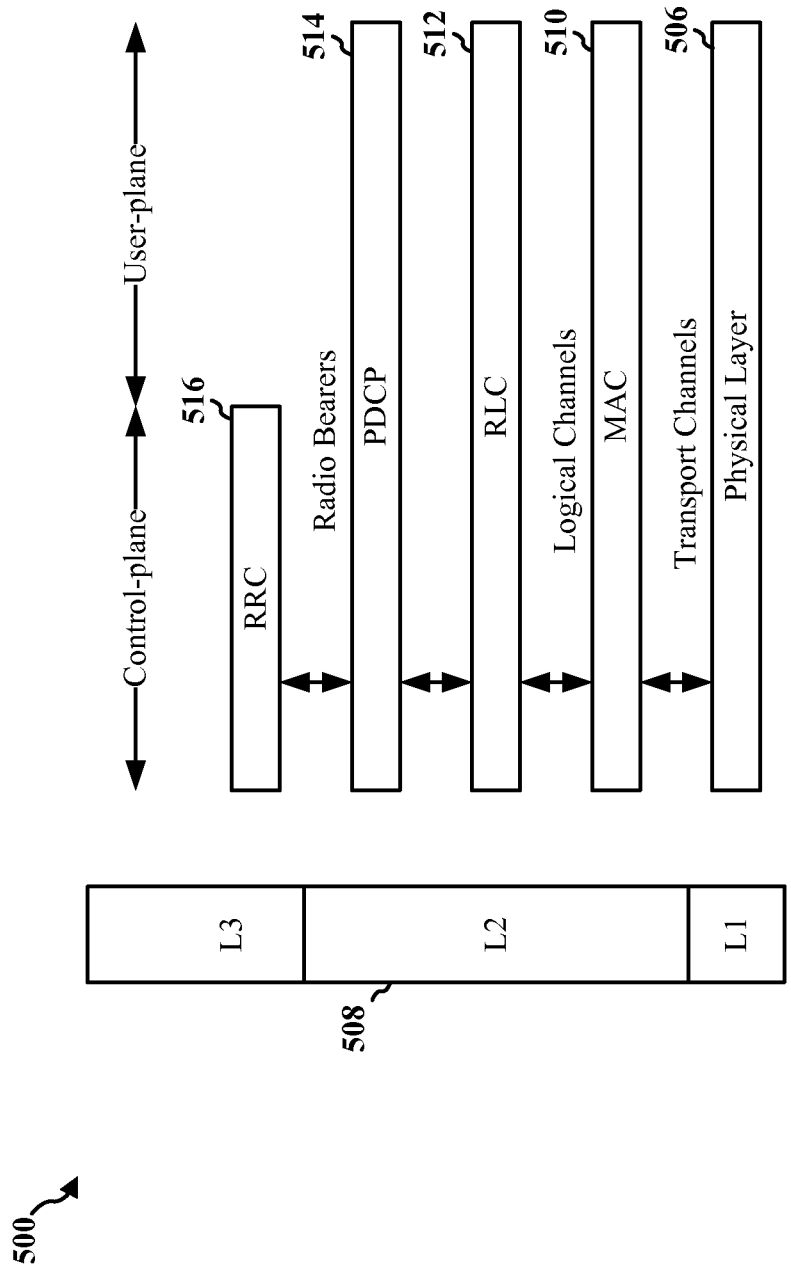
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
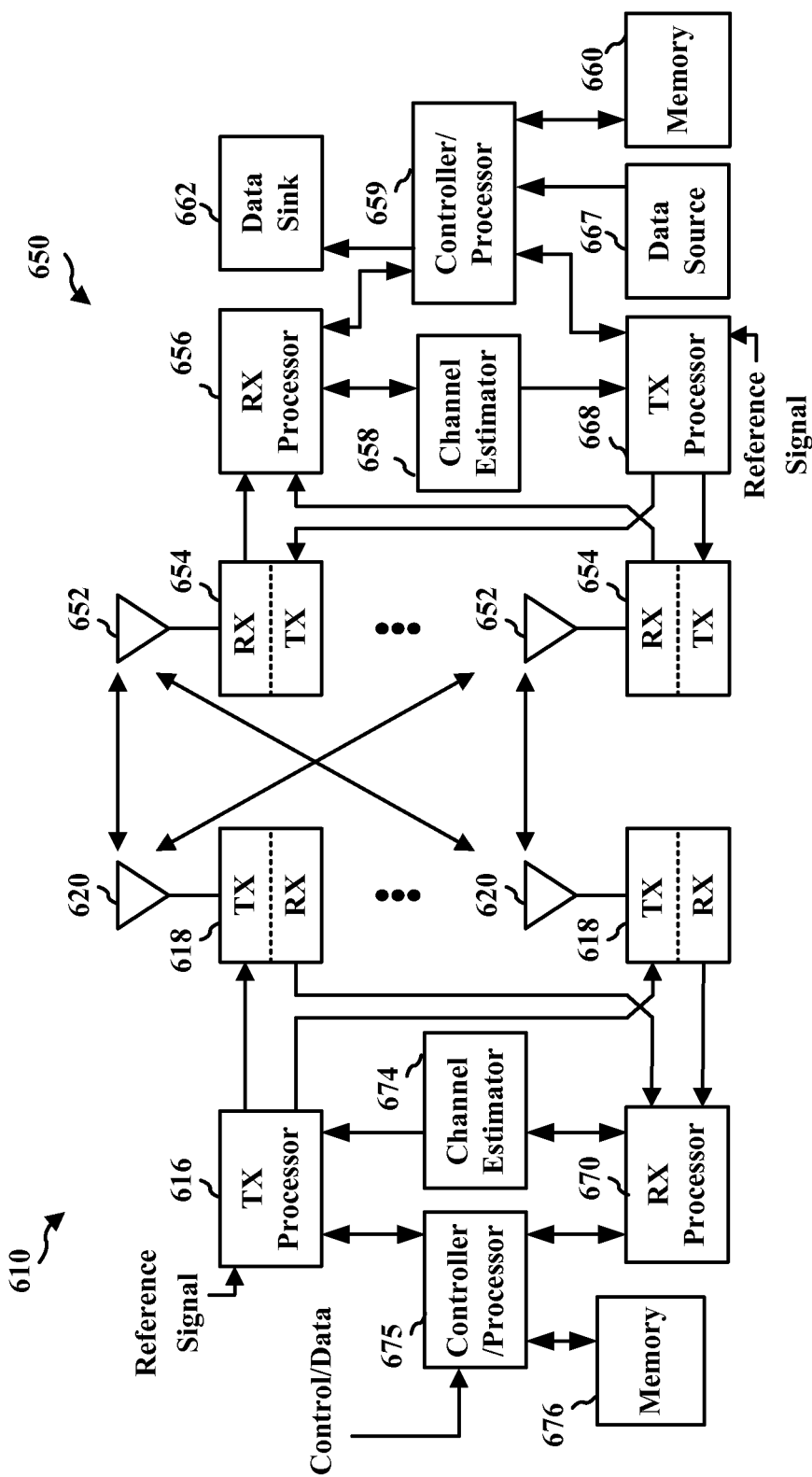
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgment (ACK) and/or negative acknowledgment (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to an RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In some examples, UE 650 determines K subsets of a resource pool. Each subset may include K grid elements, each grid element including at least K sub-elements. The UE 650 may select one subset of the K subsets of the resource pool. Additionally, the UE 650 may transmit a message using K sub-elements of the selected subset.

Figure 7:
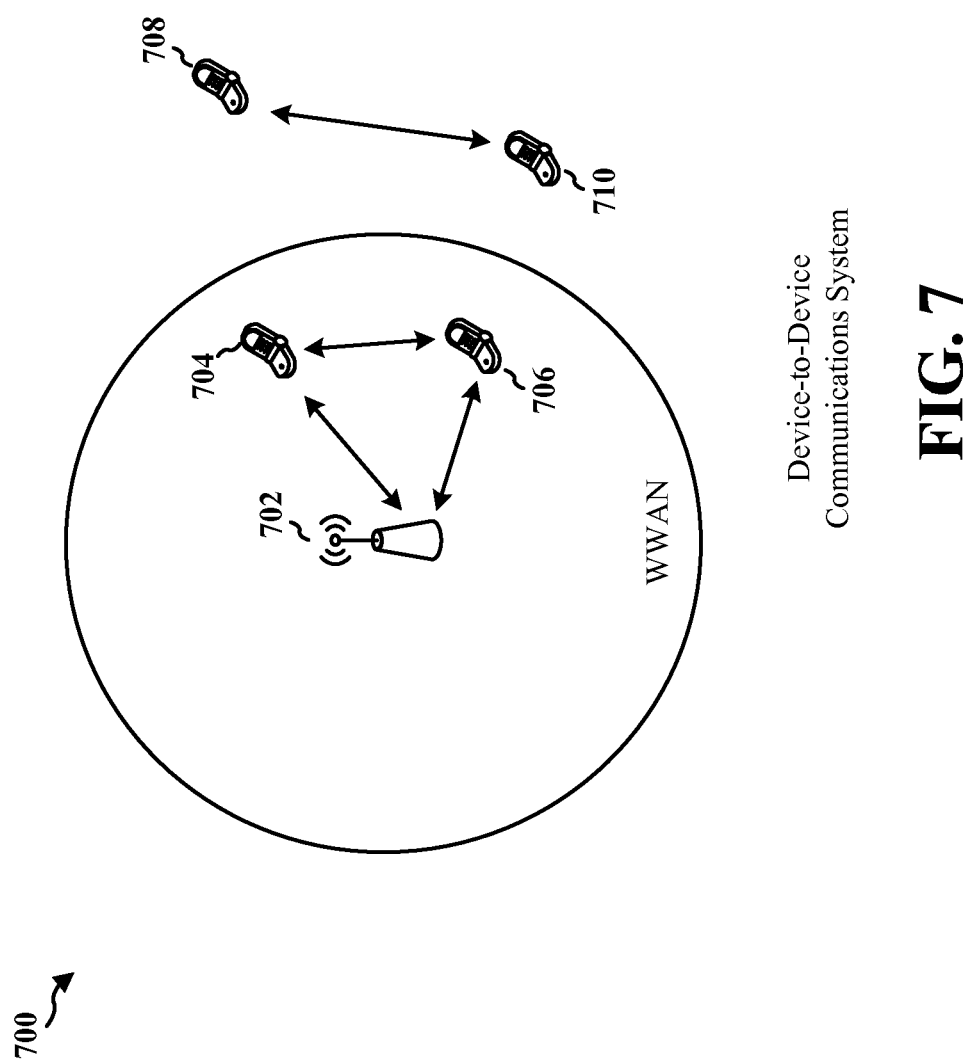
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as, for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

The systems and methods described herein may generally be applied to various communication systems, such as, for example, the device-to-device communications system 700. Some systems and methods may be applied to LTE-Direct (LTE-D) communication for Vehicle-To-Vehicle (V2V). Furthermore, while the systems and methods described herein may generally be applied to many different communication systems, these systems and methods may particularly be applied to communication systems using half duplex communication.

In some examples, one or more of the plurality of wireless devices 704, 706, 708, 710 may be half-duplex wireless devices. For example, assume that each wireless device 704, 706, 708, 710 is a half duplex wireless device. Accordingly, when device 704 is transmitting, wireless device 704 cannot receive from wireless devices 706, 708, 710, base station 702, or other communication devices. Similarly, when wireless device 706 is transmitting, wireless device 706 cannot receive from wireless devices 704, 708, 710, base station 702, or other communication devices. When wireless device 708 is transmitting, wireless device 708 cannot receive from wireless devices 704, 706, 710, base station 702, or other communication devices. Similarly, when wireless device 710 is transmitting, wireless device 710 cannot receive from wireless devices 704, 706, 708, base station 702, or other communication devices.

Example systems and methods may provide an extension of time resource pattern of transmission (T-RPT) to allow for mitigation of problems with half duplex communication. When half duplex communication is used, a first communication device cannot monitor other communication devices when the first communication device is transmitting. As one specific example of problems with half duplex communication, the time resource pattern of transmission design in LTE Release 12 (Rel-12) has a problem of persistent collision.

In some examples, the wireless devices 704, 706, 708, 710 determines K subsets of a resource pool. Each subset may include K grid elements, each grid element including at least K sub-elements. Each of the wireless devices 704, 706, 708, 710 may select one subset of the K subsets of the resource pool. Additionally, the wireless devices 704, 706, 708, 710 may transmit a message using K sub-elements of the selected subset.

Figure 8:
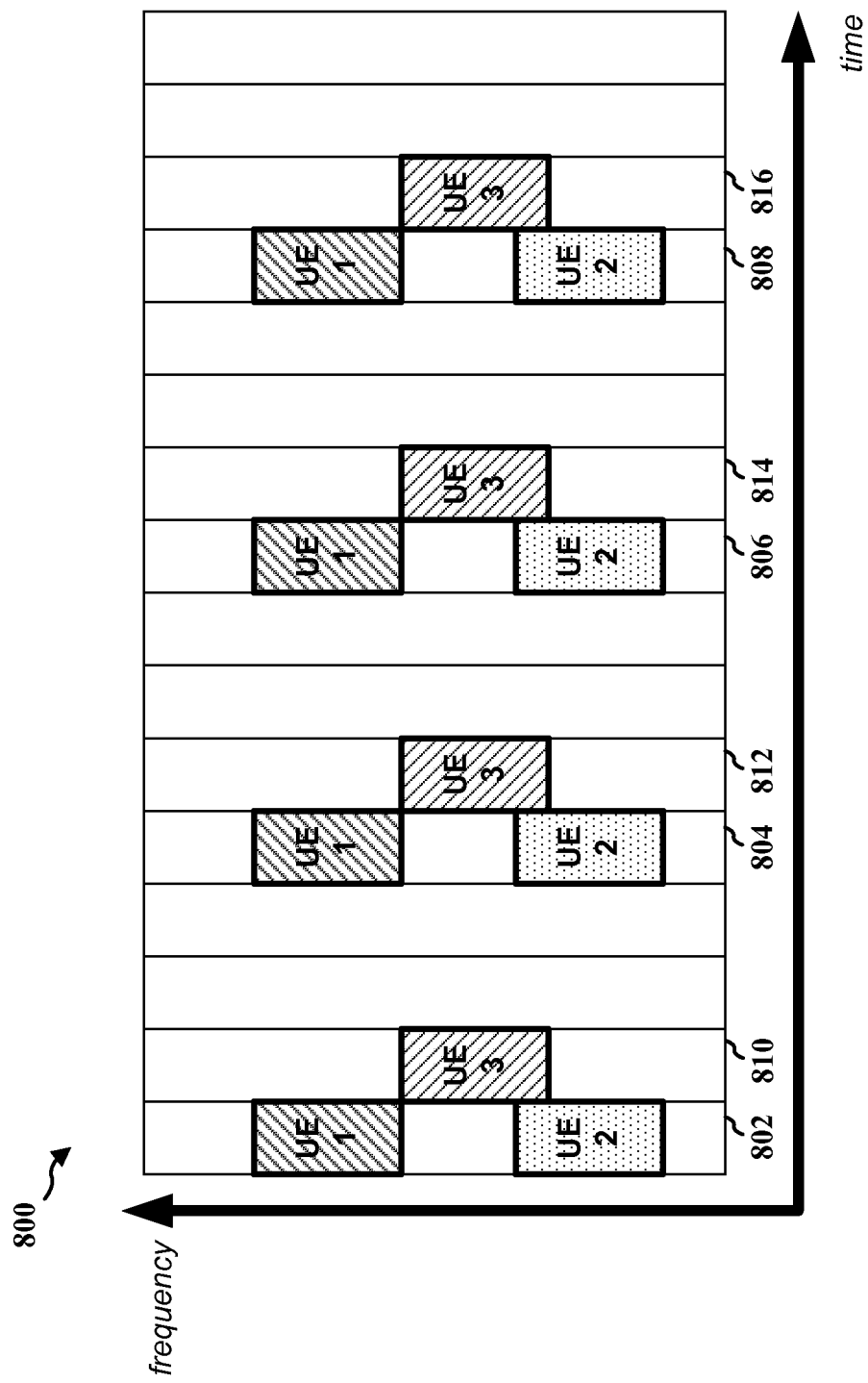
FIG. 8 is a diagram illustrating an example set of time and frequency resources having a time resource pattern of transmission design for an LTE Release 12 time resource pattern of transmission design for D2D data.

FIG. 8 is a diagram illustrating an example set of time and frequency resources 800 having a time resource pattern of transmission design for an LTE Release 12 time resource pattern of transmission design for D2D data. As illustrated in FIG. 8, the x-axis is time, and the y-axis is frequency. The diagram of FIG. 8 illustrates transmissions by three UEs, UE1, UE2, and UE3. As illustrated in FIG. 8, UE1, and UE2 transmit during the same time blocks 802, 804, 806, 808. UE3 transmits immediately following each of the time blocks 802, 804, 806, 808 at time blocks 810, 812, 814, 816. As illustrated in FIG. 8, all transmissions of UE1 collide with all transmissions of UE2. In other words, assuming UE1 is a half duplex UE, then UE1 cannot receive the transmission of UE2. Similarly, assuming UE2 is a half duplex UE, then UE2 cannot receive the transmission of UE1.

Some examples described herein may have one or more of the following properties for repeated transmissions: (1) minimize number of UEs that transmit at the same time for all transmissions, (2) for any two UEs, minimize number of transmissions that happen at the same time, and/or (3) maximize frequency diversity by hopping across entire bandwidth.

Figure 9:
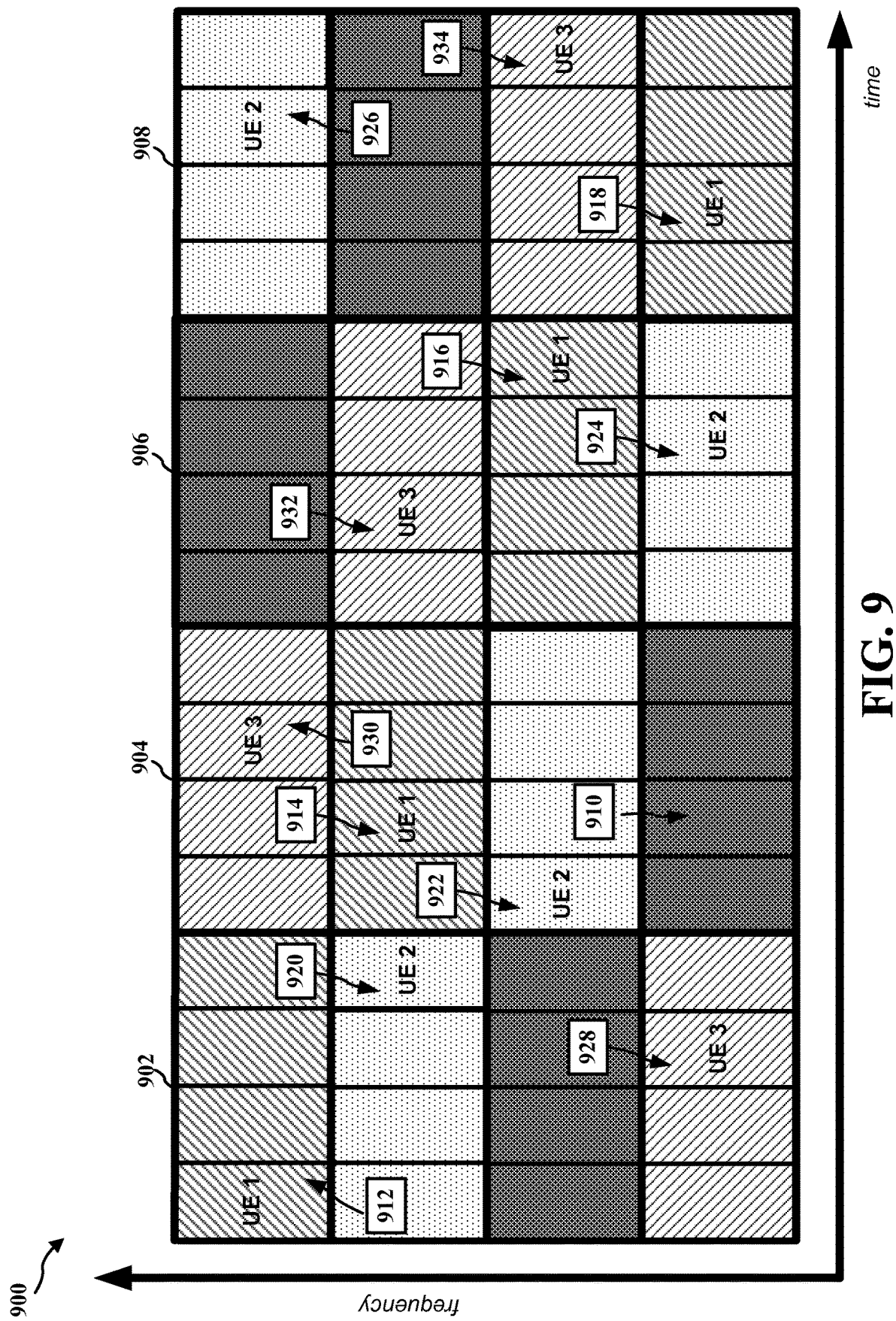
FIG. 9 is a diagram illustrating an example set of time and frequency resources having a time resource pattern of transmission design in accordance with the systems and methods described herein.

FIG. 9 is a diagram illustrating an example set of time and frequency resources 900 having a time resource pattern of transmission design in accordance with the systems and methods described herein. As illustrated in FIG. 9, similar to FIG. 8, the x-axis is time, and the y-axis is frequency. The example time resource pattern of transmission, design illustrated in FIG. 9 may generally meet the properties discussed above, i.e., (1) minimize number of UEs that transmit at the same time for all transmissions, (2) for any two UEs, minimize number of transmissions that happen at the same time, and/or (3) maximize frequency diversity by hopping across entire bandwidth.

As illustrated in FIG. 9, a set of time and frequency resources are divided into a 4×4 grid having four separate sets 902, 904, 906, 908. Each set 902, 904, 906, 908 consists of four gird element, with each grid element having four time/frequency resources, such as time/frequency resource 910. Time/frequency resource 910 may be, for example, a subelement of a subset, such as a number of resource blocks within a subframe for the transmission of one media access control (MAC) packet data unit (PDU) by a UE.

In an example, a UE may pick one subset to transmit on. The UE may also pick exact resources within the subset that may be used for transmission. As described herein, the systems and methods provide a general way to support time resource pattern of transmission for a variable number of transmissions.

The example of FIG. 9 illustrates a specific example using a 4×4 grid as described above. The systems and methods described herein may be generalized to a more general case, e.g., a K*K grid.

For example, let $N_t$ be the number of subframes (SFs). In LTE, for example, each radio frame include 10 subframes. The subframe may be a downlink subframe. The subframe may be an uplink subframe. The subframe may be a special subframe. In some examples, a base station, e.g., eNB, may notify the uplink-downlink subframe configuration to the UE in a system message. Let $N_f$ be the number of physical resource blocks (PRBs) in the available frequency bandwidth.

Let K be the (maximum) number of transmissions of a Minimization of Drive Tests (MDT) Application Control Protocol (MACP) digital unit (DU). Time/frequency resources may be divided into a K*K grid of floor ($N_t$/k) sub-frames and floor($N_f$/k) resource blocks (RBs) each.

Similarly to the 4×4 grid example of FIG. 9, time/frequency resources may be divided into a K*K grid. The K*K grid is divided into K subsets such that: (1) each subset has K grid elements, (2) all the K grid elements occupy distinct time resources, and (3) all the K grid element occupy distinct frequency resources. A UE may select on these sub-sets to transmit on.

Within the subset, to determine exact resources that the UE will use, a logical to physical mapping (hopping) is defined. This hopping can be one Type 1 or Type 2 hopping defined for PUSCH or Type 2B hopping defined for discovery or resource hopping defined for control.

One frame in LTE is 10 ms. One subframe is 1 ms. Accordingly, there are 10 subframes for each frame. Each subframe may be further divided into two slots having a resource block each, e.g., physical resource blocks (PRBs). The allocation of LTE physical resource blocks (PRBs) may be handled by a scheduling function at the base station (eNodeB). The physical resource block may be further subdivided.

The frequency resources available in LTE may be split into 12 separate frequency resources, e.g., 12 separate subcarriers. Accordingly, one LTE physical resource block may be split into 84 resource elements, i.e., 12 subcarriers times 7 symbols.

Some number, K*K physical resource blocks may be used for a time resource pattern of transmission in accordance with the systems and methods described herein. The K*K physical resource blocks may be overlaid on the LTE physical resource blocks, as described herein.

For example, a UE may determine K subsets of a resource pool, such as time and frequency resources 900. Each subset including K grid elements. Each grid element including at least K sub-elements, such as time/frequency resource 910, which may include a number of resource blocks within a subframe for the transmission of one MAC PDU by a UE. U1, U2, or U3 may be a UE such as UE 102 of FIG. 1, UE 206 of FIG. 2, or UE 650 of FIG. 6, for example. Accordingly, UE 102, UE 206, or UE 650 may determine K subsets of a resource pool.

The UE may select one subset of the K subsets of the resource pool. For example, UE1 may select one or more of sub-elements 912, 914, 916, 918. UE2 may select one or more of sub-elements 920, 922, 924, 926, for example. UE3 may select one or more of sub-elements 928, 930, 932, 934, for example. As illustrated in FIG. 9, U1, U2, and U3 do not have any collisions in the illustrated example. U1, U2, or U3 may be a UE such as UE 102 of FIG. 1, UE 206 of FIG. 2, or UE 650 of FIG. 6, for example.

The UE may transmit a message using K sub-elements of the selected subset. As discussed above, U1, U2, or U3 may be a UE such as UE 102 of FIG. 1, UE 206 of FIG. 2, or UE 650 of FIG. 6, for example. Accordingly, UE 102, UE 206, or UE 650 may transmit a message using K sub-elements of the selected subset.

In some examples, the K grid elements of a subset occupy distinct time resources. The K grid elements of a subset may occupy distinct frequency resources. The K grid elements of a subset may occupy both distinct time resources and distinct frequency resources. In some examples, K is a maximum number of transmissions of a media access control (MAC) packet data unit (PDU). In some examples, the K sub-element belongs to a distinct grid element. Determining the K subsets of a resource pool may include receiving a value for K. The value for K may be received via a radio resource control (RRC) signaling.

Figure 10:
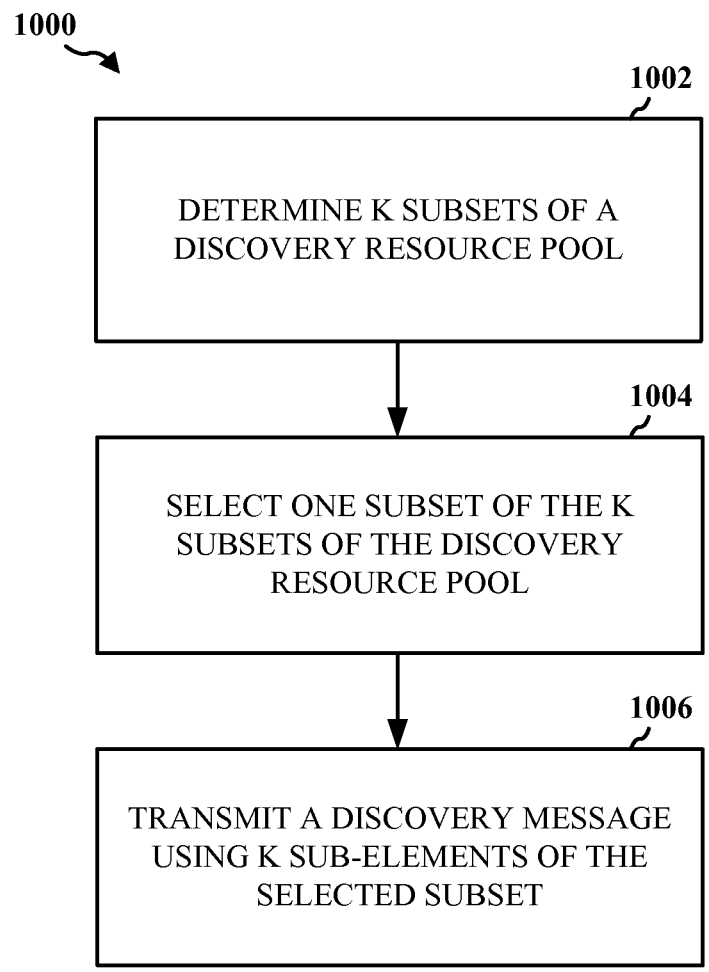
FIG. 10 is a flowchart 1000 of a method of wireless communication.

FIG. 10 is a flowchart 1000 of a method of wireless communication. The method may be performed by a UE, (e.g., UE 102 of FIG. 1, UE 206 of FIG. 2, or UE 650 of FIG. 6).

At block 1002, the UE determines K subsets of a resource pool. For example, a UE may determine K subsets of a resource pool, such as time and frequency resources 900 of FIG. 9. Each subset including K grid elements. Each grid element including at least K sub-elements, such as time/frequency resource 910, which may include a number of resource blocks within a subframe for the transmission of one MAC packet PDU by a UE. U1, U2, or U3 may be a UE such as UE 102 of FIG. 1, UE 206 of FIG. 2, or UE 650 of FIG. 6, for example. Accordingly, UE 102, UE 206, or UE 650 may determine K subsets of a resource pool. Each subset including K grid elements. Each grid element including at least K sub-elements.

More specifically, controller/processor 675, TX processor 616, RX processor 670 of eNB 610, controller/processor 659, TX processor, RX processor 668, or other circuitry may determines K subsets of a resource pool.

At block 1004, the UE selects one subset of the K subsets of the resource pool. For example, UE1 may select one or more of sub-elements 912, 914, 916, 918 of FIG. 9. UE2 may select one or more of sub-elements 920, 922, 924, 926, for example. UE3 may select one or more of sub-elements 928, 930, 932, 934, for example. As illustrated in FIG. 9, and discussed above, U1, U2, and U3 do not have any collisions in the illustrated example. U1, U2, or U3 may be a UE such as UE 102 of FIG. 1, UE 206 of FIG. 2, or UE 650 of FIG. 6, for example.

More specifically, controller/processor 675, TX processor 616, RX processor 670 of eNB 610, controller/processor 659, TX processor, RX processor 668, or other circuitry may select one subset of the K subsets of the resource pool.

Finally, at block 1006, the UE transmits a message using K sub-elements of the selected subset. As discussed above, U1, U2, or U3 may be a UE such as UE 102 of FIG. 1, UE 206 of FIG. 2, or UE 650 of FIG. 6, for example. Accordingly, UE 102, UE 206, or UE 650 may transmit a message using K sub-elements of the selected subset.

More specifically, controller/processor 659, TX processor, RX processor 668, or other circuitry may select one subset of the K subsets of the resource pool may transmit a message using K sub-elements of the selected subset. The message may be transmitted using, for example, one or more of transmitter 654TX, antenna 620, or antenna 652 may transmit a message using K sub-elements of the selected subset.

In some examples, the K grid elements of a subset occupy distinct time resources. The K grid elements of a subset may occupy distinct frequency resources. The K grid elements of a subset may occupy both distinct time resources and distinct frequency resources. In some examples, K is a maximum number of transmissions of a media access control (MAC) packet data unit (PDU). In some examples, the K sub-element belongs to a distinct grid element. Determining the K subsets of a resource pool may include receiving a value for K. The value for K may be received via a radio resource control (RRC) signaling.

Figure 11:
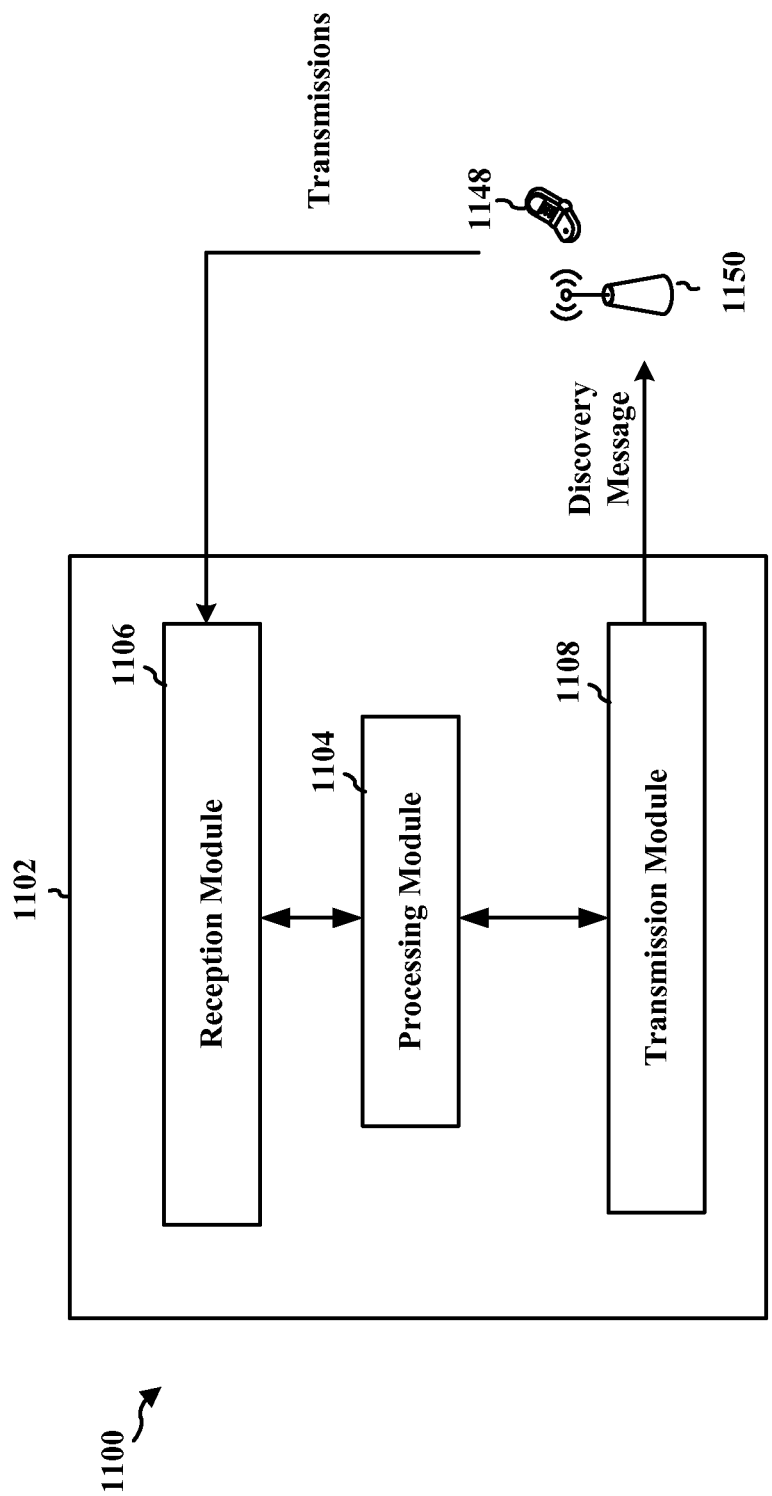
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a processing module 1104. The processing module 1104 may determine K subsets of a resource pool. Each subset may include K grid elements. Each grid element may include at least K sub-elements.

The processing module 1104 may select one subset of the K subsets of the resource pool transmitting a message using K sub-elements of the selected subset.

The processing module 1104 may cause a message to be transmitted. For example, the processing module may cause a transmitting module 1108 to transmit a message using K sub-elements of the selected subset. Accordingly, data may flow between the processing module 1104 and the transmission module 1108. The data may include control information that causes the transmitting module 1108 to transmit a message using K sub-elements of the selected subset.

The apparatus 1102 may implement the systems and methods described herein.

Similarly, apparatus 1102 may receive a message using K sub-elements of the selected subset from one or more UEs 1148. Accordingly, reception module 1106 may receive transmissions of one or more messages using K sub-elements of the selected subset. The reception module 1106 may provide data related to the message to the processing module 1104.

The apparatus may include additional modules that perform each of the blocks of the algorithm in the aforementioned flowcharts of FIG. 10. As such, each block in the aforementioned flowcharts of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The processing module 1104 may be implemented with a bus architecture, represented by the connections between the processing module 1104, the reception module 1106 and the transmission module 1108. The connections may be one or more buses and may include any number of interconnecting buses and bridges depending on the specific application of the apparatus 1102. Any buses used may links together various circuits including one or more processors and/or hardware modules, represented by the processing module 1104. The processing module 1104 may also include one or more computer-readable mediums or memories. The processing module 1104 may include one or more buses connecting any processors in the processing module to any memories in the processing module 1104. Any buses may also link various other circuits such as timing sources, peripherals, voltage regulators, and power management circuits, which are well known in the art, and therefore, will not be described any further.

The processing module 1104 may be coupled to the reception module 1106 and/or the transmission module 1108. The transceiver or the reception module 1106 and/or transmission module 1108 may be coupled to one or more antennas (not shown) to provide a means for communicating with various other apparatus over a transmission medium. The reception module 1106 receives a signal from the one or more antennas, extracts information from the received signal, and provides the extracted information to the processing module 1104. In addition, the reception module 1106 receives information from the processing module 1104 and, based on the received information, generates a signal to be applied to the one or more antennas. The processing module 1104 may include a processor coupled to a computer-readable medium/memory. The processor may be responsible for general processing, including the execution of software stored on the computer-readable medium/memory. The software, when executed by the processor, may cause the processing module 1104 to perform the various functions described supra for any particular apparatus. The computer-readable medium/memory may also be used for storing data that is manipulated by the processor when executing software.

The memory may store instructions. The instructions may be software running on the processor, resident/stored in the computer readable medium/memory, one or more hardware modules coupled to the processor, or some combination thereof. The processing system may be a component of the eNB 610 and may include the memory 676 and/or at least one of the TX processor 616, the RX processor 670, and the controller/processor 675. In another example, the processing system 1214 may be a component of the UE 650 and may include the memory 660 and/or at least one of the TX processor 668, the RX processor 656, and the controller/processor 659.

In one configuration, the apparatus 1102 for wireless communication includes means for determining K subsets of a resource pool, each subset including K grid elements, each grid element including at least K sub-elements, such as the processor 675. The apparatus 1102 for wireless communication includes means for selecting one subset of the K subsets of the resource pool, such as the processor 675. The apparatus 1102 for wireless communication includes means for transmitting a message using K sub-elements of the selected subset, such as the processor 675. As described above, the means for transmitting a message may include transmitter 618TX, 620TX, 654TX and/or antennas 620, 652. The aforementioned means may be one or more of the aforementioned modules of the apparatus 1102 and/or the processing module 1104 of the apparatus 1102 configured to perform the functions recited by the aforementioned means. As described supra, the processing module 1104 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Similarly, in one configuration, the apparatus 1102 for wireless communication includes means for determining K subsets of a resource pool, each subset including K grid elements, each grid element including at least K sub-elements. The apparatus 1102 for wireless communication includes means for selecting one subset of the K subsets of the resource pool. The apparatus 1102 for wireless communication includes means for transmitting a message using K sub-elements of the selected subset.

The aforementioned means may be one or more of the aforementioned modules of the apparatus 1102 and/or the processing module 1104 of the apparatus 1102 configured to perform the functions recited by the aforementioned means. As described supra, the processing module 1104 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, the method comprising:

determining K subsets of a resource pool comprising time-frequency resources, the determination made by partitioning a time period of the time-frequency resources into the K subsets, each subset including K grid elements, the K grid elements formed by partitioning frequency resources of each subset into K frequency ranges, each grid element of the K grid elements including a total of K sub-elements;

selecting one subset of the K subsets of the resource pool; and transmitting a message using K sub-elements of the selected subset, wherein a value for K is 4, wherein the time-frequency resources are divided into a 4×4 grid having 4 subsets, each subset having 4 grid elements, each grid element having 4 sub-elements, wherein each of the subelements used to transmit the message are within distinct grid elements, wherein time-frequency resources are divided into a K*K grid of floor ($N_t/k$) sub-frames and floor ($N_f/k$) resource blocks (RBs) each, where $N_t$ is a number of sub-frames and $N_f$ is a number of physical resource blocks (PRBs) in an available frequency bandwidth.

2. The method of claim 1, wherein the K grid elements of a subset occupy distinct time resources.

3. The method of claim 1, wherein the K grid elements of a subset occupy distinct frequency resources.

4. The method of claim 1, wherein the K grid elements of a subset occupy both distinct time resources and distinct frequency resources.

5. The method of claim 1, wherein K is a maximum number of transmissions of a media access control (MAC) packet data unit (PDU).

6. The method of claim 1, wherein each of the K sub-elements belongs to a distinct grid element.

7. The method of claim 1, wherein determining the K subsets of the resource pool includes receiving the value for K.

8. The method of claim 7, wherein the value for K is received via a radio resource control (RRC) signaling.

9. An apparatus for wireless communication, the apparatus comprising:

a memory; and at least one processor coupled to the memory and configured to:

determine K subsets of a resource pool comprising time-frequency resources, the determination made by partitioning a time period of the time-frequency resources into the K subsets, each subset including K grid elements, the K grid elements formed by partitioning frequency resources of each subset into K frequency ranges, each grid element of the K grid elements including a total of K sub-elements;

select one subset of the K subsets of the resource pool; and transmit a message using K sub-elements of the selected subset, wherein a value for K is 4, wherein the time-frequency resources are divided into a 4×4 grid having 4 subsets, each subset having 4 grid elements, each grid element having 4 sub-elements, wherein each of the sub-elements used to transmit the message are within distinct grid elements, wherein time-frequency resources are divided into a K*K grid of floor ($N_t/k$) sub-frames and floor ($N_f/k$) resource blocks (RBs) each, where $N_t$ is a number of sub-frames and $N_f$ is a number of physical resource blocks (PRBs) in an available frequency bandwidth.

10. The apparatus of claim 9, wherein the K grid elements of a subset occupy distinct time resources.

11. The apparatus of claim 9, wherein the K grid elements of a subset occupy distinct frequency resources.

12. The apparatus of claim 9, wherein the K grid elements of a subset occupy both distinct time and distinct frequency resources.

13. The apparatus of claim 9, wherein K is a maximum number of transmissions of a media access control (MAC) packet data unit (PDU).

14. The apparatus of claim 9, wherein each of the K sub-elements belongs to a distinct grid element.

15. The apparatus of claim 9, wherein determining the K subsets of the resource pool includes receiving the value for K.

16. The apparatus of claim 15, wherein the value for K is received via a radio resource control (RRC) signaling.

17. An apparatus for wireless communication, the apparatus comprising:
   means for determining K subsets of a resource pool comprising time-frequency resources, the determination made by partitioning a time period of the time-frequency resources into the K subsets, each subset including K grid elements, the K grid elements formed by partitioning frequency resources of each subset into K frequency ranges, each grid element of the K grid elements including a total of K sub-elements;
   means for selecting one subset of the K subsets of the resource pool; and
   means for transmitting a message using K sub-elements of the selected subset, wherein the value for K is 4, wherein the time-frequency resources are divided into a 4×4 grid having 4 subsets, each subset having 4 grid elements, each grid element having 4 sub-elements, wherein each of the sub-elements used to transmit the message are within distinct grid elements, wherein time-frequency resources are divided into a K*K grid of floor ($N_t/k$) sub-frames and floor ($N_f/k$) resource blocks (RBs) each, where $N_t$ is a number of sub-frames and $N_f$ is a number of physical resource blocks (PRBs) in an available frequency bandwidth.

18. The apparatus of claim 17, wherein the K grid elements of a subset occupy distinct time resources.

19. The apparatus of claim 17, wherein the K grid elements of a subset occupy distinct frequency resources.

20. The apparatus of claim 17, wherein the K grid elements of a subset occupy both distinct time resources and distinct frequency resources.

21. The apparatus of claim 17, wherein K is a maximum number of transmissions of a media access control (MAC) packet data unit (PDU).

22. The apparatus of claim 17, wherein each of the K sub-elements belongs to a distinct grid element.

23. The apparatus of claim 17, wherein the means for determining includes means for receiving the value for K.

24. The apparatus of claim 23, wherein the value for K is received via a radio resource control (RRC) signaling.

25. A non-transitory computer-readable medium storing computer executable code for wireless communication, the computer executable code comprising code for:
   determining K subsets of a resource pool comprising time-frequency resources, the determination made by partitioning a time period of the time-frequency resources into the K subsets, each subset including K grid elements, the K grid elements formed by partitioning frequency resources of each subset into K frequency ranges, each grid element of the K grid elements including a total of K sub-elements;
   selecting one subset of the K subsets of the resource pool; and
   transmitting a message using K sub-elements of the selected subset, wherein a value for K is 4, wherein the time-frequency resources are divided into a 4×4 grid having 4 subsets, each subset having 4 grid elements, each grid element having 4 sub-elements, wherein each of the sub-elements used to transmit the message are within distinct grid elements, wherein time-frequency resources are divided into a K*K grid of floor ($N_t/k$) sub-frames and floor ($N_f/k$) resource blocks (RBs) each, where $N_t$ is a number of sub-frames and $N_f$ is a number of physical resource blocks (PRBs) in an available frequency bandwidth.

* * * * *